United States Patent [19]

Wey et al.

[11] Patent Number: 5,498,087
[45] Date of Patent: Mar. 12, 1996

[54] WIDE WEB COMPATIBLE PRINTER

[75] Inventors: Geoffrey A. Wey, Foothill Ranch; Kenneth A. McCrimmon, Claremont; Robert S. Crum, Hacienda Heights, all of Calif.

[73] Assignee: Printronix, Inc., Irvine, Calif.

[21] Appl. No.: 288,492

[22] Filed: Aug. 10, 1994

[51] Int. Cl.$^6$ .................................................. B41J 05/00
[52] U.S. Cl. .............................. 400/68; 400/61; 400/63; 400/708; 395/117
[58] Field of Search ........................... 400/61, 76, 708, 400/68, 615.2, 63, 3, 9, 10; 395/117

[56] References Cited

U.S. PATENT DOCUMENTS 4,671,683  6/1987  Ueno ........................................ 400/708
5,286,120  2/1994  Udono ...................................... 400/68

Primary Examiner—Edgar S. Burr
Assistant Examiner—Steven S. Kelley
Attorney, Agent, or Firm—George F. Bethel; Patience K. Bethel

[57] ABSTRACT

This specification discloses apparatus and a process for printing data on a web of print from data related to a wider web than that to be printed upon. It includes a printer having a paper output of a narrower web than data from the wider web, and the provision of data as to the narrow and wide web width. The apparatus and process establishes the difference between the narrow web width of the printer and the wide web width and calculates the number of pages of narrow web width to be printed thereafter forming a raster output from the difference between the narrow web width and the wide web width to establish the width for printing by the printer.

25 Claims, 3 Drawing Sheets

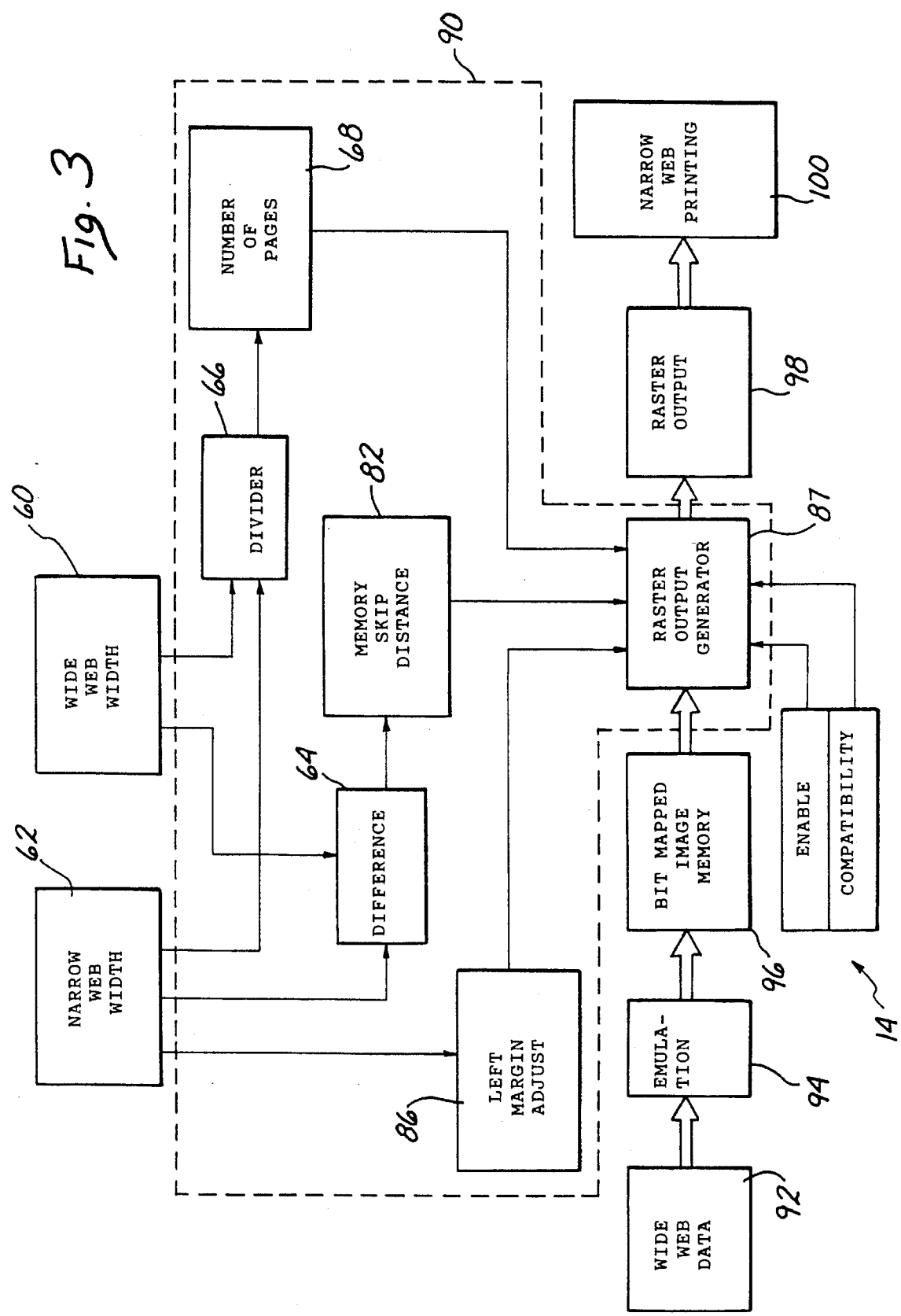

5,498,087

WIDE WEB COMPATIBLE PRINTER

FIELD OF THE INVENTION

The field of this invention is within the printer art as it relates to printing with impact printers, thermal printers, laser printers, or any other type of printing or transfer means. It specifically relates to the printing of a page in a sequential or columnar manner so that printing data from a wide web printing program can be printed onto a narrow web page. This is effected by sequencing the printer program to print the first portion of the material of the wide web on a first printed segment of a narrow web and the second and sequential portions of the wide web page on a sequential columnar portion of the narrow web. This fundamentally transposes the data material from the wide web format so as to split it into serialized columns on the narrow web format.

BACKGROUND OF THE INVENTION AND PRIOR ART

The prior art with regard to computerized printing has often utilized a relatively wide web page that can exceed 13 inches. The wide web page has printed material going from the left side to the right that can be sequential or distinct portions although being on the same line. This data is formed digitally by discrete raster lines. Often times, the printing on the wide web page can be columnar printed subject matter spread across the page.

Such columnar material printed on a wide web page can be such wherein there are multiple columns of material going from the left to the right. The columns of material can be printed in a format that allows for like material or differentiated columns going from the left to right across the page. The columns of material can then be sequenced again in the next series of columns spaced downwardly on the page.

This columnar format or arrangement can be used with regard to label applications such as bar codes. For instance, often times labels which include bar codes are printed on a wide web material such that there might be two or more labels or pages going from left to right across a single piece of paper or bar code label substrate.

This invention allows label application programs having data developed for wide web printers to be printed on a narrow web printer without a modification of the application program. For instance, the implementation of the invention can be such wherein label printing of multiple labels across a 13.2 inch wide web printer can be staggered by sequentially printing them on a narrow web printer in columnar form. This is effected by the use of the same application program without a modification. Thus, a dramatic improvement is provided by this invention with respect to the programming and software to create greater use of the existing application program for wide web data not merely for a discrete wide web printer.

The solution by the invention lies in its apparatus and method being able to take wide web printing data from a host which is received with an image developed in a page memory. This wide web page image or virtual image is then modified by the invention hereof for printing on a narrow web printer.

In order to print the wide web data material, a narrow web printer page width and length are selected. This defines the narrow web page image. During the printing, the wide web or virtual image is then parsed or segregated into a narrow web width into columns or serialized sequential rows. In this manner, each wide web page is printed sequentially on a narrow web printer.

A result is the target page length of the printed data material has been formed to provide wide web material parsed sequentially onto a narrow web. The ensuing net result with regard to labels is to allow them to be cut individually or in sets on a narrow web or unit substrate. This results in the printing of labels and bar code label application programs on a narrow web printer without modification.

The invention serves to protect user investments in applications software programs and provides greater compatibility with the elimination or the need to modify label or other applications programs.

SUMMARY OF THE INVENTION

In summation, the wide web compatible printing apparatus, method and system of this invention modifies the normal printing algorithm or virtual page of a wide web printer. The bitmap that is for the wide printed page will fit on a narrow web. The net result is to allow the user to create a "virtual" image that is larger than the physical paper and then break it up into pieces or serialized columns from the wide web width to be printed sequentially on the narrow web width.

Initially, the user supplies a data for a wide web page image thereafter for printing on a narrow web width. The wide web width is the virtual or logical width that the user or the program operates under. This is the width of the image given.

The virtual or logical width is then narrowed to a columnar form of the width that the user wishes to print in a narrow web format. It can be the width of a single segment of the data (i.e. a single label) or some multiple of the width of each label.

The printer language, or emulation, uses the wide web width such that this is the only width that exists. The emulation treats the wide web width as the width of the page. However, when given the page to print the print engine driver then breaks it up into pieces sequentially based upon the breakdown from a wide web to a narrow web width. This is fundamentally the net result growing out of the physical paper size of the narrow web width.

Generally in summation, the invention first prints a single page, the width of the narrow web width. When finished with that it will skip over the first narrow web width distance and print another page of the same width. This continues until the entire wide web width page is printed so that a reorientation from a lateral to a vertical sequence of the data or the labels, or other printed material is accomplished.

BRIEF DESCRIPTION OF THE DRAWINGS

FIG. 3 shows a block schematic diagram of the functions of the printer in conjunction with the process of and apparatus of this invention.

DESCRIPTION OF THE PREFERRED EMBODIMENTS

Figure 1:
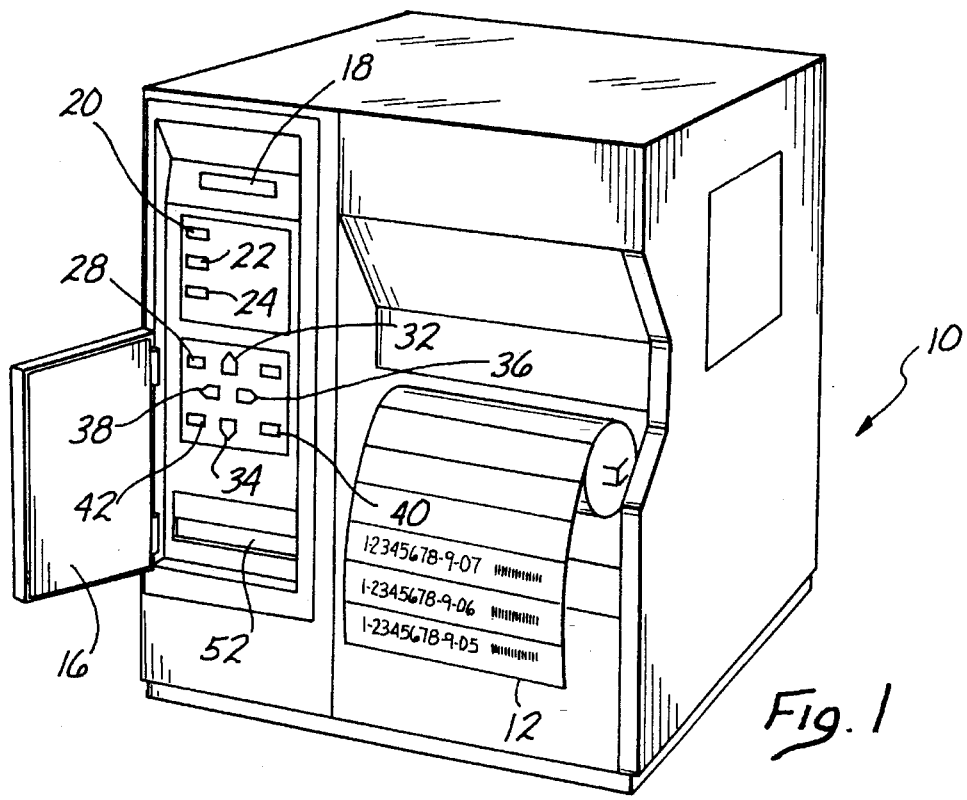
FIG. 1 shows a perspective view of a thermal type of printer that can be used with this invention.

Looking more specifically at the figures in a detailed manner, it can be seen that FIG. 1 shows a printer 10. The printer 10 is a thermal type of printer which has the ability to feed out a sheet of direct thermal/thermal transfer printing paper 12 that has been printed upon. The sheet of direct thermal/thermal transfer printing paper 12 can have labels on it or any other suitable printed or code material that can be printed upon. In this particular instance, the printer 10 is supplied with paper 12 that can be formed as a series of bar code labels formed serially one after the other.

The paper 12 is of a narrow web width and can be printed upon through the thermal printing process. Suffice it to say, other types of narrow web printers such as impact printers, laser printers, thermal transfer, or other type printers can be used with the system, process, and invention hereof.

The printer 10 includes a control panel 14 with a door or cover 16 that allows access to it. The control panel 14 includes a readout 18 that can be of any suitable form to provide information to the user. For instance, the respective menu or the program which the printer 10 allows in its configuration or system architecture is provided in a readout form for the menu on the readout 18.

The upper portion of the control panel 14 is provided with a switch 20 for an on line/pause function of the entire printer. A second switch 22 allows the paper 12, feed system to move the paper forward.

A further input means in the form of switch 24 allows a clear function so that any errors can be cleared manually by pressing the switch 24.

The lower portion of the panel 14 provides for menu selection and input functions. A switch 28 allows for the cancellation of any data by taking any data in the input buffer and canceling it so that it does not get printed.

As in all cases of menu structures, they go from the first or larger global menu to a lesser hierarchy or more detailed input structures. The switches have been particularly designed in the panel to allow for vertical up or down menu selection from a horizontal, left or right menu input.

In particular, to access a higher menu order an up switch formed as up arrow 32 is provided. This allows the menu to go up in its hierarchy of instructions.

The switch 34 having an arrow pointing downwardly allows for the menu to be driven downwardly into a lower level menu structure.

Switch 36 moves the menu through the established level to the next item horizontally in the structure. The arrow switch 38 pointing to the left moves the structure to the prior or horizontal menu status.

An enter switch 40 allows the switch to enter and tell the printer to accept the parameter as entered. A run and stop switch 42 starts the printing and stops the printing of a self test of the printer with its internal diagnostics.

The foregoing control functions are interconnected with a circuit board which can be in part controlled by a disk placed within slot 52. Thus the control functions in conjunction with a disk in part incorporating the invention hereof permits data from a host with a wide web configuration to be entered into the printer for narrow web printing.

Figure 6:
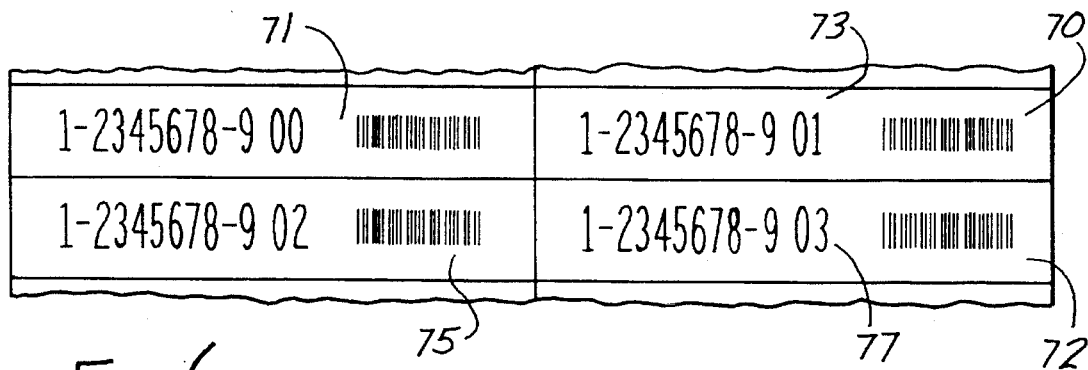
FIG. 6 shows a portion of a wide web label that is on a wide web width configuration.

For instance, in FIG. 6, there are a series of labels shown that are bar code labels that can also be considered and referred to as printer pages. These labels or pages have been printed on a wide web configuration of for example 13.2 inches in width in a printer that can be a thermal, laser, or impact printer. The labels as can be seen are labeled with their last digits going from the left to the right and then again to the next column as 00, 01, 02, and 03. These labels have been printed by the printer 10 of this invention as columnar labels shown in FIG. 7 on a narrow width web configuration that can be in the neighborhood of a width of 6.5 inches for example.

FIG. 3 shows one of the inputs being a menu setting of the wide web width through a wide web input. This is accomplished through the panel 14, by inputing the wide web width in the process step 60. This particular wide web width establishes both the horizontal and the vertical size.

The narrow web width is established through an input process 62 into the menu.

Both the wide web input and the narrow web input can be set through the host data input instead of the panel and menu selection, if the user prefers.

The respective widths are then compared and calculated in process 64 so that the difference of the actual widths is established. In addition to the actual difference in the width, a divider process function 66 divides the wide web width by the narrow web width. This provides the number of pages for process or step 68.

Figure 7:
FIG. 7 shows the labels of FIG. 6 of the wide web sequentially oriented on a narrow web width which is the net result of this invention.

In the example given in FIGS. 6 and 7 if the wide web width of FIG. 6 held two labels or pages 71 and 73 on each width, and the labels were to be printed on pages or labels of the narrow web width of FIG. 7, the narrow web width number of pages or labels as calculated through process 68 would be twice the number. For instance, full pages 70 and 72, including labels or lesser pages 71, 73, 75, and 77 of FIG. 6 would then be columnarly oriented as pages 74, 76, 78 and 80 of a narrow web width printout on sheet 12.

The invention hereof establishes the portion of the wide web width of pages 70 and 72 that must be skipped in order to print the material in each raster line in the narrow web configuration of pages or labels 74 through 80. This is established by a memory skip distance process 82 which is established by the difference between the narrow web and wide web width. The memory skip distance is the distance for example to the right of the page 70 constituting label 73 that must be skipped.

The entire raster wide width printout is with regard to the page 70 having the labels 71 and 73. The single label 71 raster print is without printing the label 73 (i.e. the label having the last digit of 01). The last digit 01 label 73 is then printed as page or label 76 as can be seen in FIG. 7. This is done by printing each raster line of page 70 constituting label 71 prior to printing the label 73 as will be expanded upon hereinafter.

In order to provide for the proper width, for instance of label 71, a left margin adjust 87 is provided. This left margin adjust process is such where it provides the narrower width such as the narrow web width as to each page as is exemplified by the pages 74 through 80 shown in FIG. 7. The left margin adjust would be 0 for the first page or label 74 of the narrow web width of FIG. 7. One width would be required for the second page, and two narrow web width distances for the third page, if there were to be a third page.

The foregoing processes as established by the menu and through the control functions of the circuitry are then provided to a raster output generator which has been labeled raster output generator 87. The entire function of the foregoing elements are incorporated in the software, firmware, and operations of the processor 90 that has been dotted in.

In order to initiate the process, wide web data from the host is provided through process 92. This wide web data from the host is then interpreted through an emulation function 94. This emulation function fundamentally builds a bitmap image which is representative of all the respective dots to be printed. The 1 bits represent a dot while the 0 bits represent a space. This entire bitmap is built within the emulation function 94.

This bitmap is then provided to a bit mapped image memory 96. The bitmapped memory data is then sent to the raster output generator 87 that re-characterizes the wide web bitmap to the narrow web data for a raster output 98. In effect the raster output is foreshortened to be the length of only label or page 71, until label 71 is entirely printed, afterwhich it skips label 71 to entirely print label 73. This provides narrow web printing through the printer function 100 that is inherent within the printer 10 or any other suitable printer using the process and apparatus of this invention.

The entire operation is initiated at the control panel 14 for enablement and compatibility, or from a host command.

Figure 2:
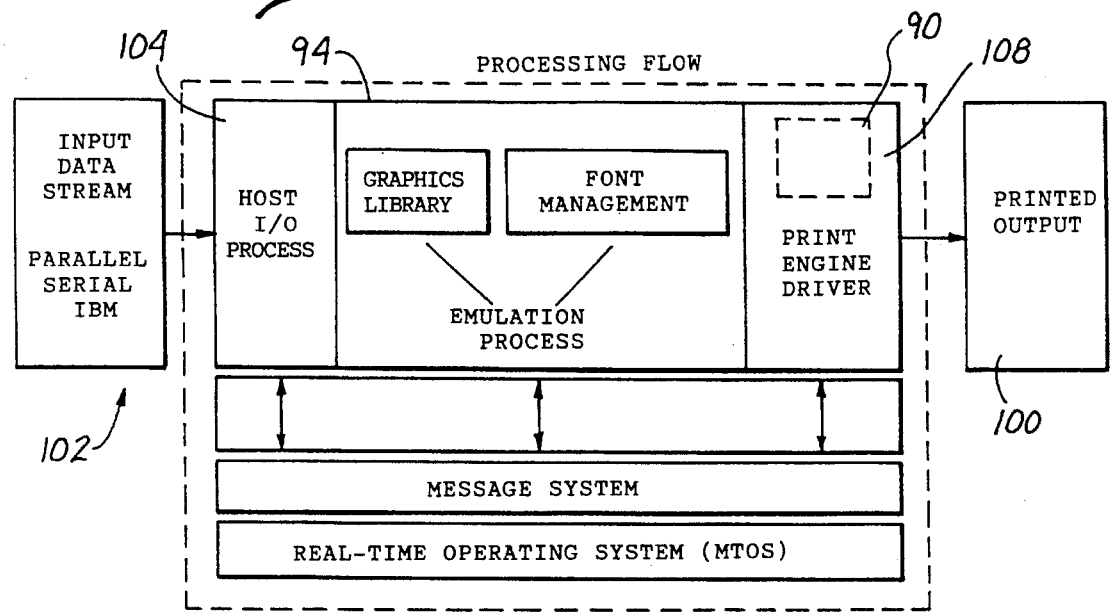
FIG. 2 shows a processing flow diagram of the invention.

For purposes of understanding the nature of the processing flow, it can be seen in FIG. 2 that a data input stream from a host such as a parallel, serial, or IBM coax or twinax is provided in the form of the input data stream from the computer 102. This data is received at the host input/output process 104 which is connected to an emulation process 94 which creates the bitmap from the graphics library and font library. In the meantime, a messaging system and real time operating system is connected respectively to the emulation process and the print engine driver 108. Print engine driver 108 has code (or a process) that is generally referred to as process 90 within the print engine driver, this creates the wide web to narrow web printing configuration. It fundamentally creates a printed output in the form of narrow web printing 100 through the control of each raster line as to length and number.

In order to provide an example of the system and invention hereof, the following examples will be based upon taking a wide web configuration and printing a narrow web output. This relates to the figures taking into consideration the remaining FIGS. 4 and 5 for purposes of discussion.

As previously stated the original input data from the host is processed at 92. This is dependent upon the hardware used in the printer. This task does very little processing. It just receives data from the host, and passes it along to the emulation 94.

Emulation 94 takes the individual bytes of data and interprets it. Using this data, it builds a "bitmap" of the image to be printed. The bitmap is a large block of memory, with a single bit dedicated to each possible dot on the printed page. The emulation puts a 1 in the bitmap for every dot that should be printed, and a 0 for every space to be printed when the bitmap is complete. It then passes this along to the print engine driver 108.

The print engine driver 108 is responsible for receiving the bitmap from the emulation 94 and actually printing it onto the paper. The print engine driver 108 incorporates the details of how the physical printer hardware works, and sends the proper data to it to make it print the bitmap created by the emulation.

By way of example, the wide web printing function normally uses the wide web bitmap. The raster lines extend through the whole page to be printed such as pages 70 and 72 to print both labels 71, 73 and 75 and 77 respectively on the pages. These pages incorporate raster lines sweeping across the pages to form lesser pages or individual labels 71, 73, 75, and 77.

Basically, the print engine driver 108 is given a bitmap, and the print engine driver prints the bitmap. It assigns each dot to the paper sequentially in a raster line. A single sequential group of memory values corresponds exactly to a single raster line printed on the page. There are enough bits for the exact width of the paper.

For example, on a given printer having a 6.3 inch wide print width, of 203 dots per inch, there are 160 bytes of data for a given print line. This is calculated as follows:

bytes = [ (width-in-inches * dots-per-inch) , rounded up to nearest 32]/8 bits per byte, or bytes = [(6.3"* 203 dots/inch) rounded up] /8 bits per byte, bytes = [1279 ――>rounded to 1280] /8 bits per byte, bytes = 160.

There are enough lines for whatever the page or label length is. For example, if a page is 4 inches long at 203 dots-per-inch, there will be 4 * 203 = 812 lines. Thus, the total memory of the bitmap in the above example would be 812 lines * 160 bytes/line = 129,920 bytes.

The print engine driver 108 sends out this data to the printer for the page. It sends out one line at a time to be printed. If the starting, or base, address of the page is address 0, then for the first line, the printer will send out addresses 0–159. For the second line, addresses 160–319. This continues for the entire page.

Figure 4:
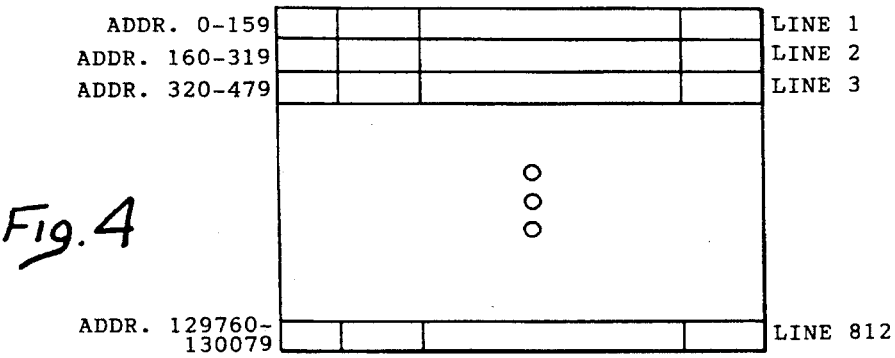
FIG. 4 shows a schematic view of a standard printing process on a wide web width.

Diagrammatically, this is shown in FIG. 4.

Figure 5:
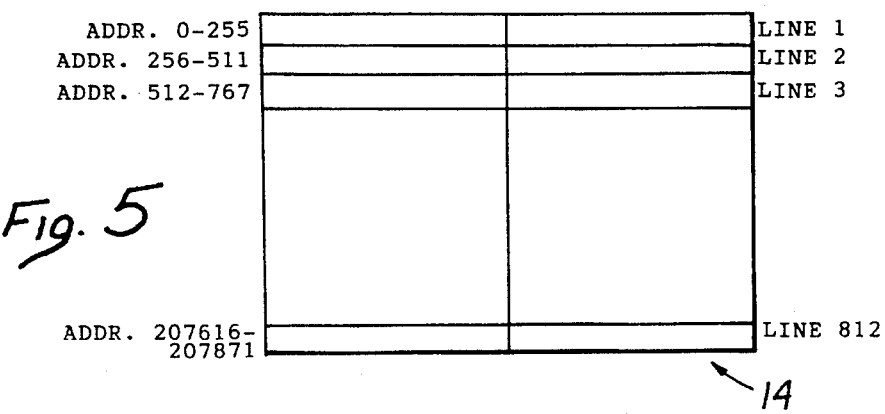
FIG. 5 shows a schematic view of the wide web data being printed on a narrow web configuration.

The conversion of the wide web print shown in FIG. 5 resulting in Pages 70 and 72 and discrete labels or lesser pages 71, 73, 75, and 77 of FIG. 6 is provided by modifying the printing algorithm. The wide web function implies that the entire image shown in the bitmap to print the pages of FIG. 5 (i.e. pages 70 and 72) will fit on the paper.

The wide web to narrow web function of this invention allows the user to create a "virtual" image of the wide web pages 70 or 72 that is larger than the physical paper. It will then break the virtual image up into pieces (i.e. lesser pages or labels 71, 73, 75, and 77) to form columns. These lesser pages or labels are then printed sequentially as pages or labels 74 through 80 in columnar form as in FIG. 7.

The wide web width is the "virtual" or "logical" width that the user operates with for printing a normal page with full width pages such as 70 and 72. This is the width of the image given, and corresponds exactly to the bitmap shown for standard printing.

The narrow web width is the width of each page or "column" in FIG. 7 (i.e. labels 74 through 80) that the user wishes to print. It is the width of a single piece of the data (i.e. a single label or page 74 through 80), or some multiple of the width of each label. In most cases, it will be about the same as the physical paper width.

To create the image or bitmap, the emulation 94 uses the width selected by the wide web width through the menu input on panel 14 as wide web-width 60. As far as the emulation 94 is concerned, this is the only width that exists. It treats the wide web width as the width of the page.

When given the page to print, the print engine driver 108 then breaks it up into pieces, based upon the wide web width to narrow web width, and the physical paper width. The engine 108 first prints a single page the width of the narrow web width. When finished with that, it will skip over the web width distance forming the first page or label 71, and print another page or label 73 of the same narrow web width. This continues until the entire page is printed. This is seen in the example of FIG. 5 resulting in the pages or labels 74, 76, 78 and 80, which respectively correspond to the lesser pages or labels 71, 73, 75, and 77 of the wide web width pages 70 and 72.

The following process steps describe the details of how the pages are printed when using the wide web to narrow web invention in the print engine driver 108.

1. The print engine driver determines the minimum of the narrow web width and the page width at input 62 and saves it as the narrow width column such as that of FIG. 7. This will be used for further calculations. This is actually computed in bytes as described above. However, there is a direct correspondence between bytes and inches, using the same calculations used above (i.e. width in inches * 203 dots per inch/8 bits per byte number of bytes).

2. The difference between the wide web width input 60 and the value determined by step 1. is calculated again in bytes. This is referred to as the "memory skip distance" 82 and will be used in later calculations.

3. The engine 108 then starts printing a page. However, for each line it does not send out enough data for the entire bitmap or raster line as it did for the wide web case described above as related to FIG. 4 and resulting in printed labels or pages 70 and 72. Instead, it only sends out enough data for the column or narrow web width calculated in step 1., which results in label 74 of FIG. 7.

4. After sending out the data for the raster line (in step 3.), the printer adds the memory skip distance 92 to its pointer to the raster. This causes it to skip over the rest of the data beyond the column being printed, so that the next raster line therebelow is printed correctly.

5. Steps 3. and 4. are then repeated for every raster (line) on the page. When each line is printed, then the entire first page or label (first column) page 74 of FIG. 7 has been printed.

The pointer that points to the current location to be printed, is reset back to the beginning of the bitmap. The distance for the narrow web width 62 is then added to it, to skip over the first column that was just printed (i.e. label 74 derived from label 71 of page 70). For instance the column having the last digits "00" of page 71 is skipped over to print the column with the last digits of "01" to the print page 76. This is repeated until all columns of data are printed. This results in the pages having digits "02" and "03" as the last digits being printed as pages 78 and 80 in columnar form.

As to the last column to be printed, there may not be enough data to print the entire column of the narrow width. Therefore, the routine calculates the minimum of the value calculated in step 1. and the remaining width of the page, and uses that as the "column width". In addition, the "memory skip distance" is recalculated for the final column since it is dependent upon the column width.

An example of the calculations and rasters printed for a wide to narrow web width is as follows:

Wide-Web Width: (i.e. page 70 or labels 71 and 73) 10" (256 bytes)

Narrow-Web Width: (i.e. lesser page or label 74) 5" (128 bytes)

Label or page Width: 5" (128 bytes)

Label or page Length: 4" (812 raster lines)

The base address of the page bitmap will then be: address 0.

1. The narrow web column width (i.e. page 74) is calculated as 128 bytes, and the skip distance is calculated as 128 bytes.

2. The printing of the page is then started. For the first raster line, bytes #0–127 are sent out to the printer.

3. The pointer for the next raster is calculated to be byte #256 (128+128).

4. The rest of the 812 rasters are sent out, using the same functions as steps 2. and 3. This finishes printing a single page such as page 74.

5. The pointer for the next raster is reset to 0+128=byte #128, or the second part of page 70 which results in page or label 76.

6. Steps 2. and 3. are repeated for the next page. This time, however, the first line sent out is addresses #128–255, and the second line begins at address #384.

A diagram of the memory for this example is shown in FIG. 5.

From the foregoing, it can be seen that this invention provides the ability of printers having an input of a wide web data format to print a narrow web configuration in the same applications system program and general formatting technique. As a consequence, it is believed that this invention should be read broadly in light of the following claims.

We claim:

1. Apparatus for printing data on a web of material from data adapted to be printed on a wider web than that to be printed on comprising:

a printer having a paper output of a narrower web than the web related to the data that is to be printed;

means for providing data as to the narrow web width of said printer;

means for providing data as to the wide web width data that is to be printed;

means for establishing the difference between the narrow web width of the printer and the wide web width;

means for calculating the number of pages of said narrow web width to be printed derived from said wide web width data; and, means to provide a raster output from the difference between the narrow web width and the wide web width so as to establish the width for printing by said printer printing the narrower web width of said printer.

2. The printer as claimed in claim 1 further comprising:

means for dividing the wide web width data per raster line by said narrow web width to provide the number of pages of said narrow web width to said raster output generator.

3. The printer as claimed in claim 1 further comprising:

means for calculating the difference between said wide web width and said narrow web width connected to an output for maintaining the skip distance of the wide web data as to the narrow web width; and, means for inputing said memory skip distance to a raster output generator.

4. The printer as claimed in claim 3 further comprising:

means to establish the width of the narrow web width to provide for a margin adjust while printing with respect to the wide web width data; and, means for inputing said left margin adjust into said raster output generator.

5. The printer as claimed in claim 4 in combination with a host which provides wide web printing data further comprising:

means for emulating said wide web printing data to provide a bitmapped image; and, means for inputing said bitmapped image to said raster output generator for allowing said bitmapped image to be printed on respective raster lines of the narrow web width.

6. The printer as claimed in claim 5 further comprising:

panel control means;

a readout for information with respect to the data to be printed;

means for inputing the width of said wide web data; and, means for inputing the number of pages of said narrow web data to be printed by said printer on said narrower web width.

7. The printer as claimed in claim 6 further comprising:

switch means on said panel to access menu selection, for display on said readout.

8. The printer as claimed in claim 1 further comprising:

means for printing bar codes on said printer.

9. A printer having a print engine driver in combination with a host which has printing data constituting an output greater in width than the width of the record medium incorporating said print engine driver further comprising:

means to determine the width of said record medium;

means to input data constituting wide web width printing data;

means for calculating the difference between the wide web width and the narrow web width of said printer, forming a memory skip distance;

means for providing narrow web data of a width constituting the column width of the narrow web printer;

means for adding the memory skip distance to the pointer on the raster of the print engine driver to cause it to skip the wide web data beyond the column being printed;

means for printing the next raster line after said skipped data; and, means for repeating every raster line of said wide web data sequentially until the entire column of the narrow web formulated data has been printed.

10. The printer as claimed in claim 9 further comprising:

means for adding the narrow web width to provide a margin in order to allow the narrow web width printer to skip over the first column that has just been printed.

11. The printer as claimed in claim 10 further comprising:

a divider for dividing the narrow web width into the wide web width.

12. The printer as claimed in claim 11 further comprising:

means for establishing the number of pages derived from the divider; and, means for inputing said number of pages into a raster output generator.

13. The printer as claimed in claim 12 further comprising:

means for establishing the difference between the narrow web width of said printer and the wide web width data; and, inputing said difference into said raster output generator to form the memory skip distance.

14. The printer as claimed in claim 9 further comprising:

means for establishing said narrow web width for purposes of providing a left margin adjust which is equivalent to the narrow web width that is to be printed; and, means for inputing said left margin adjust to said raster output generator.

15. The printer as claimed in claim 14 in combination with a host providing said wide web data that is then emulated into a bitmapped image memory, and means for inputing said bitmapped image memory to said raster output generator for establishing the width of said narrow web printing.

16. A process for printing wide web print data on a narrow web width comprising:

providing a printer having means for printing on a narrower web width than the wide web data;

establishing said narrow web width of the media of said printer to be printed upon;

providing and inputing the wide web width as established from the data of said wide web width;

calculating the difference between said wide web width and narrow web width data;

establishing a memory skip distance based upon the difference between said narrow web width and said wide web width data; and, inputing said memory skip distance to a raster output generator for providing a raster output line of the width of said narrow web printing to be printed by said printer.

17. The process as claimed in claim 16 further comprising:

dividing said narrow wide web width by said narrow web width to establish the number of pages to be printed by said narrow web width printer; and, inputing said number of pages to said raster output generator.

18. The process as claimed in claim 17 further comprising:

inputing said narrow web width for purposes of providing a left margin adjust to a narrow web width to be printed;

inputing said left margin adjust to said raster output generator; and, printing said narrow web print data by said raster output generator printing data based upon the left margin adjust.

19. The process as claimed in claim 16 further comprising:

providing wide web data from a host.

20. The process as claimed in claim 19 further comprising:

emulating said wide web data in the form of bits constituting the data to be printed.

21. The process as claimed in claim 20 further comprising:

providing a bitmapped image based upon said emulation which is then provided to said raster output generator for printing lines of print based upon said bitmap created through said emulation.

22. The process as claimed in claim 21 further comprising:

inputing the respective wide and narrow web widths to said printer by means of a control panel.

23. The process as claimed in claim 16 further comprising:

printing bar code labels from wide web data onto narrow web width columnar form as established from the bitmapped virtual image of said wide web data.

24. The process as claimed in claim 23 further comprising:

printing said bar code labels on thermal printing paper.

25. The process as claimed in claim 21 further comprising:

inputting the respective wide and narrow web widths to said printer by means of the host.

\* \* \* \* \*